Patented Apr. 9, 1929.

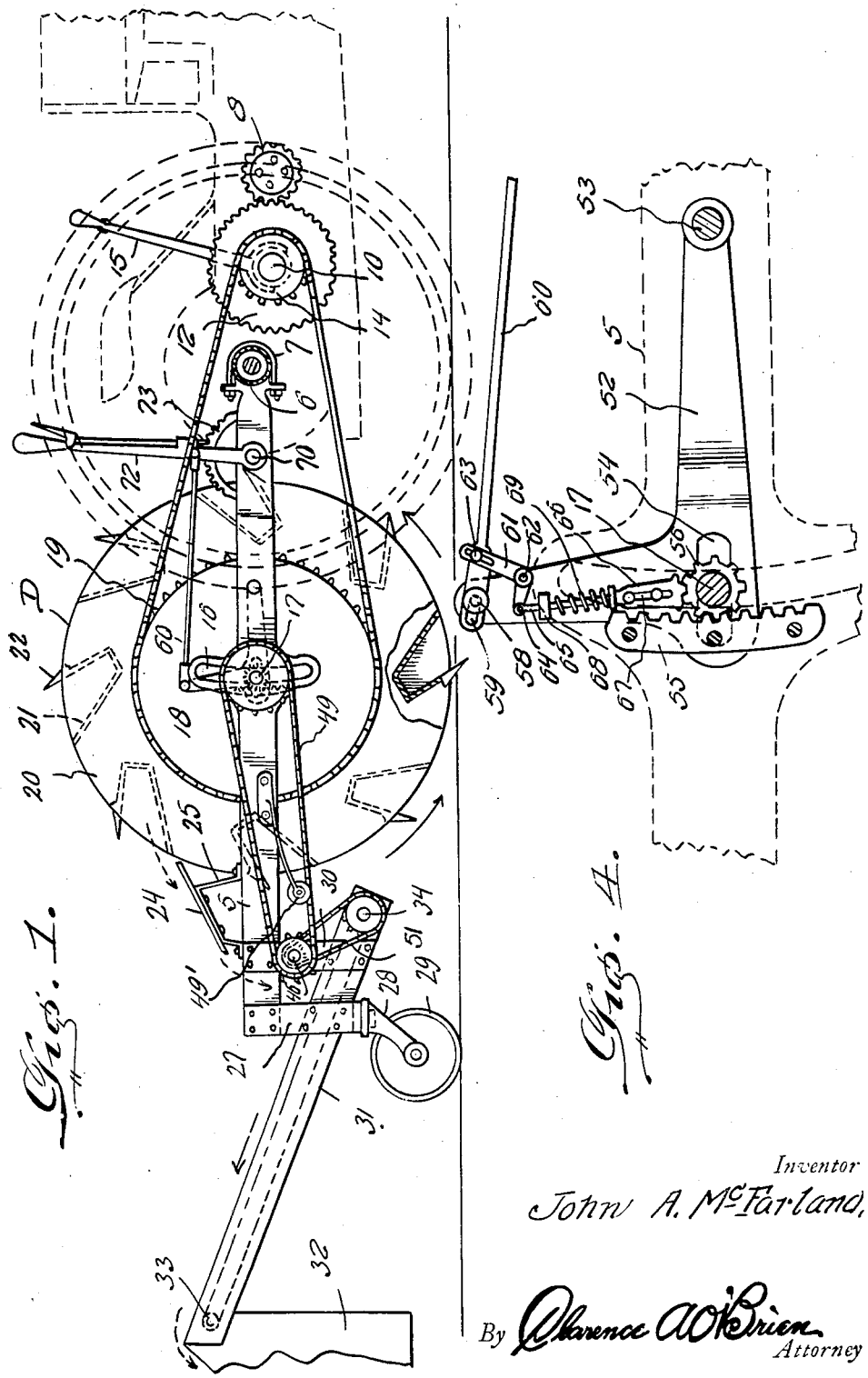

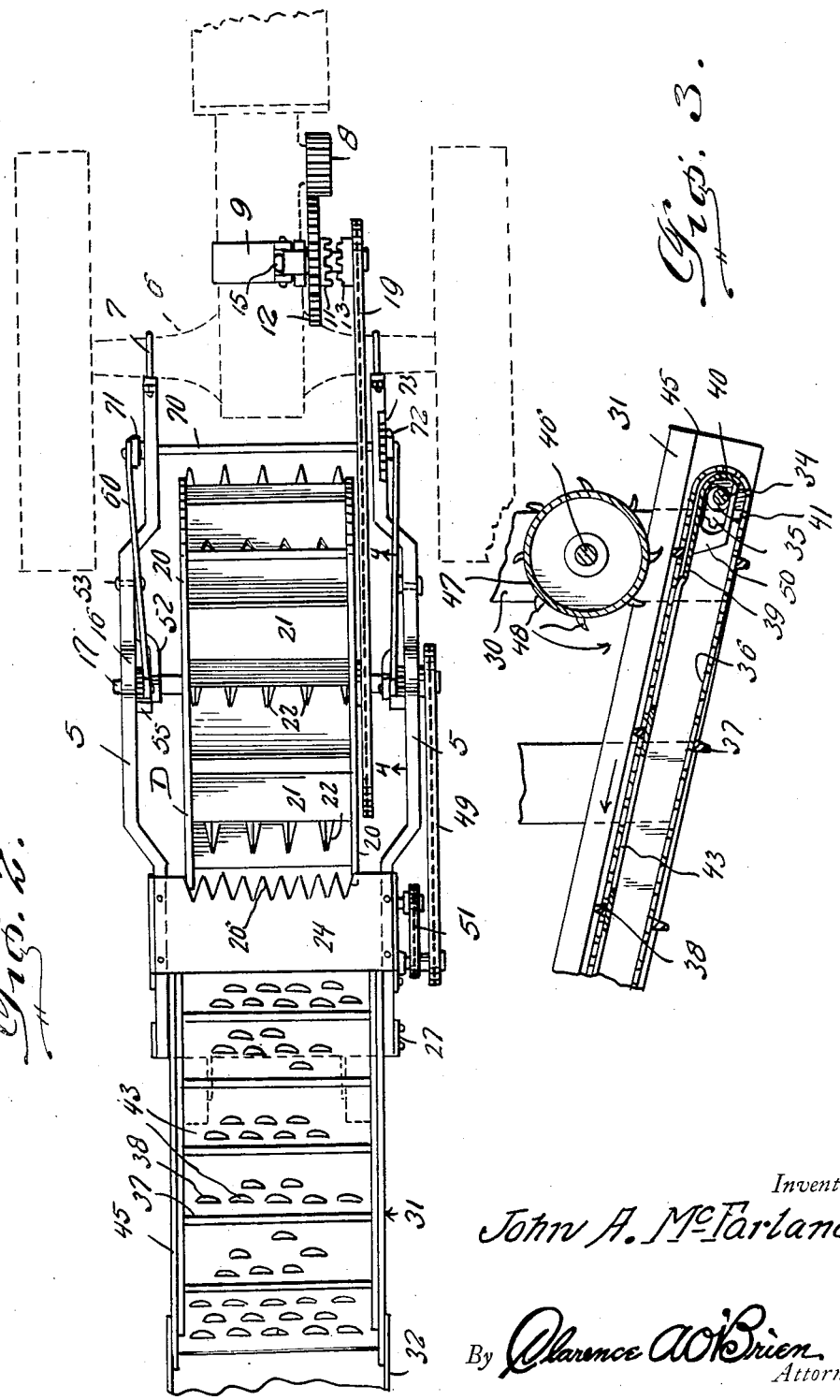

1,708,732

UNITED STATES PATENT OFFICE.

JOHN A. McFARLAND, OF LADONIA, TEXAS.

GRASS-ROOT EXTERMINATOR.

Application filed September 30, 1927. Serial No. 223,105.

The present invention relates to a grass root exterminator and has for its prime object to provide a machine of this nature which is capable of uprooting or extracting from the soil as nearly as possible the roots of any and all grasses and particularly Bermuda and Johnson grasses.

Another important object of the invention resides in the provision of a machine of this nature which may be hooked on the back of a tractor and embodies a rotating digging drum operatively connected with the tractor so as to rotate in opposite direction to the wheels of the tractor and having means for digging and uprooting the roots of the grasses and delivering them to a conveying structure.

Another important object of the invention resides in the provision of a novel frame structure for mounting the drum so that said drum may be adjusted toward and away from the ground.

Another important object of the invention resides in the provision of means for agitating the uprooted material so as to shake the soil from the roots allowing said soil to fall back on the ground and conveying the roots to a suitable receptacle or the like.

A still further important object of the invention resides in the provision of a machine of this nature with an exceedingly simple structure that is strong and durable, efficient and reliable in operation, and has its parts compactly and conveniently arranged.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of a machine embodying the features of my invention showing a portion of its drum in section and the axle portion of the tractor in section, Figure 2 is a top plan view thereof, Figure 3 is an enlarged detail vertical longitudinal section through the beater and adjacent parts of the conveying and separating structure, and, Figure 4 is an enlarged detail section taken substantially on the line 4—4 of Figure 2.

Referring to the drawing in detail, it will be seen that the frame of the machine comprises a pair of spaced parallel longitudinally extending side bars 5 the intermediate portions of which are offset outwardly. The forward ends of these side bars 5 fit up against a tractor axle housing 6 and are held engaged therewith by U-bolts 7 or in any other preferred manner. The tractor shown in dotted lines in the drawings may be of any preferred construction and in the present instance the usual power take-off pulley provided on such tractors is removed and a gear 8 is substituted therefor. A band or any other suitable supporting structure 9 is engaged on the tractor and has projecting therefrom a stub shaft 10 on which is slidable and rotatable a clutch segment 11 with a gear 12 formed integrally or otherwise fixed thereto and meshing with the gear 8. A clutch element 13 is rotatable on the stub shaft 10 and has formed integrally or otherwise fixed thereto a sprocket 14. Suitable means 15 is provided for shifting the clutch element 11 into and out of engagement with the clutch element 13 so as to cause rotation of the sprocket 14 upon rotation of the gear 8 as will be readily understood.

The centers of the intermediate portions of the side bars 5 are formed with arcuate vertically disposed slotways 16 which extend above and below the side bars. An axle 17 extends through the slotways 16 and is movable vertically therein in a manner which will appear as the description proceeds. A drum D is mounted on the axle 17 and rotates therewith. A sprocket 18 is mounted on the axle 17 and braced from drum D and rotates therewith. A chain 19 is trained over the sprockets 14 and 18, the latter being larger than the former. The gear 12 is larger than the gear 8 so that there is a reduction of speed between the gear 8 and the sprocket 18.

The drum D comprises a paid of discs 20 with a plurality of buckets 21 therebetween at regular spaced intervals about the shaft 17 adjacent the peripheries of the discs. One transverse edge of each bucket is provided with a plurality of digging teeth 22 which are adapted to penetrate the soil and dig up the roots and cause said roots to be collected in the bucket as said bucket moves forwardly below the axle adjacent the ground, and then upwardly and over the axle and then rearwardly and downwardly to a dumping position, the roots being thrown on a slide panel 24 which is inclined downwardly and rearwardly and supported on brackets 25 rising from the side bars 5 between the intermediate portions thereof and the rear ends thereof. The upper or forward edge of this slide panel 24 is formed with a plurality of teeth 26 between which the teeth 22 move so as to clean off any roots or soil which may be stuck to these teeth 22.
The rear ends of the side bars 5 are supported on depending standards 27 fixed to the rear extremities of the bars 5 and having swivelly mounted on their lower ends yokes 28 in which are journaled castor-like wheels
29. Hangers 30 depend from the rear portions of the bars 5 to the rear of the standards 25 and immediately below the rear of bottom edge of the panel 24. A conveyor frame 31 has its forward ends fixed between the hangers 30 and the standards 27 to incline upwardly and rearwardly from below the rear portions of the side bars 5. A receptacle of any suitable construction 32 may be suspended from the upper rear end of the frame 31. Shafts 33 and 34 are journaled in the rear and forward ends respectively of the frame 31 and have sprockets thereon such as at 35 over which are trained endless chains 36 having cross rods 37 extending therebetween. A platform 38 has its upper end curved or otherwise rockably supported on the shaft 33 while the lower end thereof is slightly offset downwardly as at 39 and curves about the shaft 34 in spaced relation thereto as at 40 and a cam 41 is fixed to the shaft 34 to engage the rounded end 40 so as to raise and lower the lower end of the platform for agitating purposes. This platform is provided with a plurality of series of transversely extending slits 43 each series being arranged transversely thereof as is clearly illustrated in Figure 2. As is illustrated to advantage in Figure 3 the sides of the frame 31 are offset as at 45 so that the chains may move under the shoulders thus formed so that the rungs of these chains are not visible in top plan in the assembly of the machine and are therefore protected by the soil, clods, and roots falling onto the conveyor, shaking and agitating means thus provided. A shaft 46 is journaled between intermediate portions of the hangers 30 and has a beater cylinder 47 fixed thereto with teeth 48 radiating therefrom.
A chain and sprocket mechanism 49 operatively connects the axle shaft 17 with the shaft 46 to rotate the shaft 46 at a greater rate of speed than the axle shaft 17. A spring pressed idler 49' is associated with the chain to maintain the same taut. This structure is located below the lower beater structure is located below the lower rear edge of the slide panels 24 that the material will fall thereon and be thrown against platform 38 with sufficient momentum tending to dislodge the root from the soil so that the soil will fall through the slots 43 and the roots will move upwardly along the platform in to the receptacle or the like 32. The shaking of the soil from the roots is greatly assisted by the vibratory like motion set up in the platform because of the cam 41 as heretofore intimated. This cam action is assisted by means of brackets 50 which extend under the cams 41 so that the lower end of the platform will be moved downwardly as well as upwardly. The vibrating action of the platform, therefore, is substantially positive.

The shaft 34 is rotated through a chain and sprocket mechanism 51 operatively connecting the shafts 46 and 34. An L-shaped lever 52 is pivotally mounted at one end as at 53 on the adjacent side bar, there being one of these levers 52 for each side bar, but a detailed description of one will suffice for both. One arm of the lever is disposed substantially horizontal while the other arm rises substantially vertically therefrom. At the junctures of the two arms of the lever there is formed a slot 54 for receiving the axle shaft 17. A vertical and arcuate rack bar 55 is fixed to each side bar and a rack gear 56 is rotatable on the axle shaft 17 immediately adjacent thereto and in mesh therewith. A pin 58 extends laterally from the upper end of the outer arm of the lever 52 through a slot 59 in the end of a rod or link 60. A bellcrank lever 61 is pivotally mounted as at 62 on the upper extremity of the lever 52 and has a pin and slot connection 63 with the rod 60 and a pivot connection 64 with a rod 65 rising from a tooth 66 having a pin and slot engagement 67 with the outer arm of the lever 52. The rod 65 is slidable through a lug 68 on the outer arm of the lever 52 and a coil spring 69 is disposed about the rod 65 and impinges against the lug 68 and the upper end of the tooth 66 to normally hold said tooth 66 in engagement with the rack gear 56.

A shaft 70 is journaled across the forward portions of the side bars 5 and has cranks 71 and 72 on the ends thereof with which are pivotally engaged the forward ends of links or connecting rods 60. The crank 72 is a manually operating crank having a detent and notch segment structure 73 of conventional formation associated therewith so that this crank may be held in different positions.

To raise the drum D the operator grasps the upper end of the crank lever 72 releasing the detent from the toothed segment of the mechanism 73 and pulls the crank lever forwardly to rotate the shaft 70 and at the same time thereby pull forwardly on the links or connecting rods 60 which will first swing the bell crank lever 61 to release the teeth 66 from the rack gear 56 before taking up the lost motion occasioned by pins 58 and slots 59 forming the connections between the links 60 and the upper extremities of the outer arms of the levers 52. Now further movement forwardly of the rod 60 will take up this slack so that the levers 52 will be rocked upwardly thereby lifting the drum away from the ground. By moving the handcrank 72 quickly to the rear the bell-crank levers 62 will be actuated so that the springs 69 will engage the teeth 66 with the rack gears 56 and lock the levers 52 in this adjusted position. If it is desired the drum D lowered, the operator quickly jerks forwardly on the hand crank 72 to release the teeth 66 and then move the hand crank rearwardly to let the drum down with the downward swinging of the levers 52 as will be quite apparent.

It is thought that the construction, operation, utility, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

A machine of the class described comprising a frame, wheels for supporting the rear end of the frame, means for attaching the forward end of the frame to a tractor, a drum journaled in the frame, means operatively connecting the drum with the tractor for driving the drum in a reverse direction to the wheels of the tractor, means for raising and lowering the drum in respect to the frame, said means comprising the formation of vertically disposed elongated arcuate slotways in the sides of the frame, an axle shaft for the drum slidable in the slotways, arcuate racks on the sides of the frame, rack gears rotatable on the axle shaft in mesh with the rack bars, levers pivoted on the frame and having slots through which the axle shaft projects, means for swinging the levers to raise and lower the axle shaft and drum and locking means pivotally engaged with the rack gears.

In testimony whereof I affix my signature.

JOHN A. McFARLAND.